United States Patent
Andrigo

[19]
[11] Patent Number: 6,089,665
[45] Date of Patent: Jul. 18, 2000

[54] LOAD TRANSFER STRUCTURAL MEMBER FOR A SEAT ASSEMBLY

[75] Inventor: Gregory James Alexander Andrigo, Orillia, Canada

[73] Assignee: Dura Automotive Properties Inc., Rochester Hills, Mich.

[21] Appl. No.: 09/110,740

[22] Filed: Jul. 2, 1998

[51] Int. Cl.[7] .................................................. A47C 1/02
[52] U.S. Cl. .................. 297/344.1; 297/344.11; 297/216.15; 248/429; 248/424
[58] Field of Search .......... 297/344.1, 344.11, 297/216.15; 248/424, 429, 430

[56] References Cited

U.S. PATENT DOCUMENTS

| | | | |
|---|---|---|---|
| 4,556,186 | 12/1985 | Langmesser, Jr. et al. | 248/429 |
| 4,781,353 | 11/1988 | Nishino | 248/424 X |
| 5,292,164 | 3/1994 | Rees | 248/429 X |
| 5,306,073 | 4/1994 | Rees | 297/362.14 |
| 5,322,348 | 6/1994 | Johnson et al. | 297/473 |
| 5,472,165 | 12/1995 | Gruber | 248/424 |
| 5,483,853 | 1/1996 | Moradell et al. | 248/429 X |
| 5,507,552 | 4/1996 | Ineich et al. | 297/216.1 |
| 5,582,463 | 12/1996 | Linder et al. | 297/452.2 |
| 5,664,755 | 9/1997 | Gruber | 248/424 |
| 5,722,731 | 3/1998 | Chang | 297/452.2 X |
| 5,816,555 | 10/1998 | Ito et al. | 248/424 X |
| 5,823,499 | 10/1998 | Ito et al. | 248/429 |

*Primary Examiner*—Peter M. Cuomo
*Assistant Examiner*—Rodney B. White
*Attorney, Agent, or Firm*—Robert K. Roth

[57] ABSTRACT

A vehicle seat assembly includes a seat back and a seat bottom and is attached to a vehicle support structure by a mounting assembly. The mounting assembly includes a first track and a second track supported for movement relative to the first track; the seat bottom being supported on the second track for axial movement with the second track. This allows the seat assembly to be adjusted forwardly or rearwardly by a seat occupant. The seat back can also be moved relative to the second track between an upright position and a recliner position. The seat assembly receives a seat load resulting from the seat occupant sitting in the seat with the seat back in the reclined position and/or from a forward movement of the seat occupant during a deceleration of the vehicle when the seat occupant is belted into the seat. First and second support members or mounting brackets are attached to the second track. A structural support beam is supported on the second track by the first and second mounting brackets. The beam partially distributes the seat load between the first and second support members.

28 Claims, 3 Drawing Sheets

6,089,665

LOAD TRANSFER STRUCTURAL MEMBER FOR A SEAT ASSEMBLY

BACKGROUND OF THE INVENTION

This application relates generally to an assembly for mounting a seat within a vehicle. More particularly, this invention relates to a seat mounting assembly with a load transfer member supported on a seat track by a pair of support members where the load transfer member receives seating loads and distributes the loads between the support members.

Seat track arrangements for mounting seat assemblies within vehicles are generally well known. Most arrangements provide for a seat to be moved or adjusted in forward and rearward directions within a vehicle. Some arrangements also allow the seat to be positioned in a reclined position. Usually the seat assembly includes a seat back, a seat bottom, and a mounting assembly for mounting the seat assembly to a vehicle structure.

Some seat assemblies also include a seat belt assembly that is supported solely by the seat assembly. A seat occupant who is belted into the seat assembly will exert a force on the seat assembly when the occupant experiences a deceleration load. This is known as an "all belts to seat" load. This seat load is transferred to the mounting assembly. Thus, the mounting assemblies must be strong enough to securely hold the seat assembly in place and prevent the seat from separating from the vehicle during a sudden deceleration.

Mounting assemblies that are used to mount the seat to the vehicle are often complex, especially when the mounting assemblies include track strengthening components, such as risers and support brackets that are added to the mounting assembly in order to support an all belts to seat load. These complex mounting assemblies require a great number of components, which increases the assembly time, adds weight to the vehicle, and increases the overall cost of the seat assembly.

Accordingly, it is desirable to provide a durable and robust seat mounting assembly that reduces the number of components and decreases the overall assembly cost, yet which is capable of supporting an all belts to seat load.

SUMMARY OF THE INVENTION

This invention relates to a vehicle seat assembly having a seat back and a seat bottom with the seat assembly being attached to the vehicle by a mounting assembly. The seat assembly preferably includes a seat belt assembly that is supported solely by the seat assembly. Thus, a seat occupant who is belted into the seat assembly will exert a force on the seat assembly when the occupant experiences a deceleration load. This is known as an "all belts to seat" load. This force or seat load that is exerted on the seat assembly is transferred to the mounting assembly.

In a preferred embodiment of this invention, the assembly for mounting a seat within a vehicle includes a first track and a second track supported for movement relative to the first track. The assembly further includes a first support member supported on the second track and a second support member also supported on the second track. The first and second support members are spaced apart from one another. A beam is supported on the second track by the first and second support members and partially distributes a seat load between the first and second support members.

The subject invention offers several advantages over prior art "all belts to seat" mounting assemblies because it provides a durable and robust mounting assembly that reduces the overall number of parts, reduces weight and overall assembly cost.

These and other features and advantages of the present invention will be best understood from the following specification and drawings, the following of which is a brief description.

DETAILED DESCRIPTION OF THE PREFERRED EMBODIMENT

Figure 1:
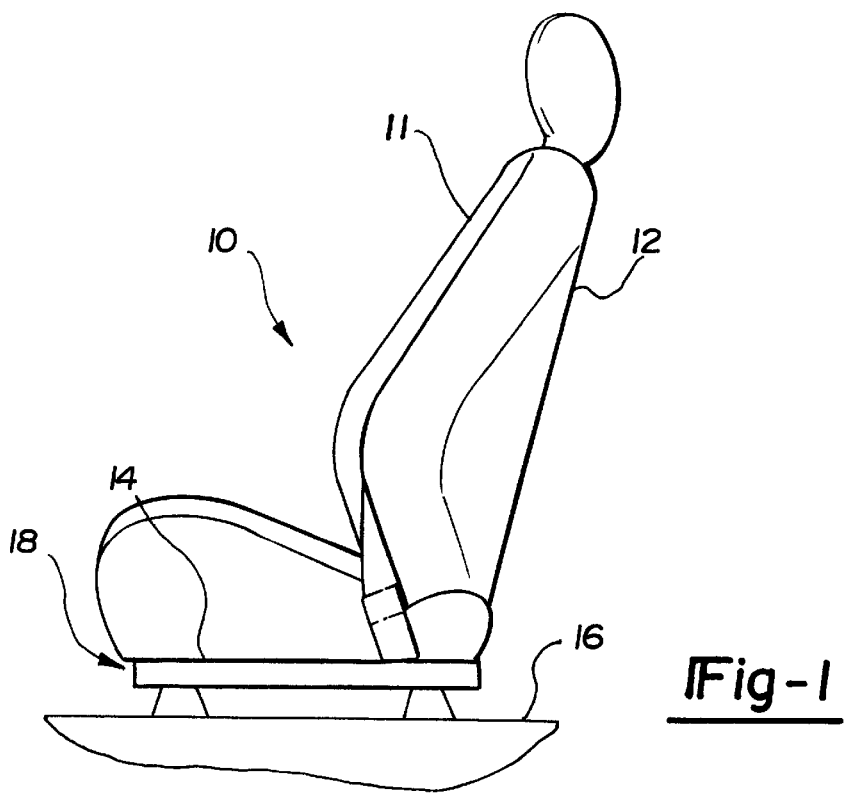
FIG. 1 is a side schematic view of a seat assembly mounted to a vehicle structure.

FIG. 1 illustrates a vehicle seat assembly 10 with a seat back 12 supported for movement relative to a seat bottom 14. The seat assembly 10 is mounted to a vehicle structure 16, such as a vehicle floor, by a mounting assembly, shown generally at 18.

Figure 2:
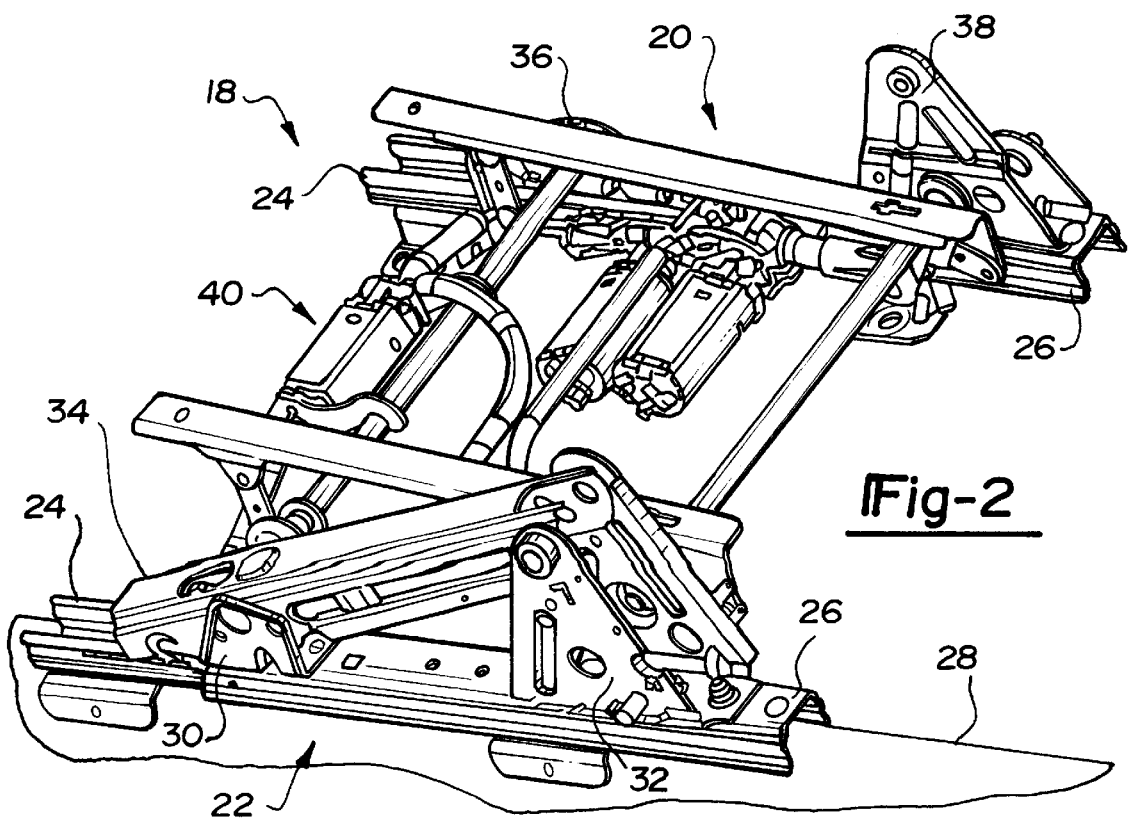
FIG. 2 is a perspective view of a preferred embodiment of a seat mounting assembly designed according to this invention.

The mounting assembly 18 is shown in greater detail in FIG. 2. The mounting assembly 18 includes track assemblies on an inboard side 20 and an outboard side 22 of the seat assembly 10. The terms inboard and outboard are used in this description for clarity and illustration purposes only and cannot be considered limiting. Both the inboard 20 and outboard 22 sides of the mounting assembly 18 include a first track 24 and a second track 26. The first track 24 is preferably a lower track 24 that is fixedly mounted to the vehicle structure 16 such as a vehicle floor, for example. The second track 26 is an upper track 26 and is received over the lower track 24 so that the upper track 26 can be moved in a forward or rearward direction relative to the lower track 24. The terms forward, rearward, upper, and lower, as used in this description, are for illustration purposes only and cannot be considered limiting. The profiles of the lower track 24 and the upper track 26 ensure that the upper track 26 only moves along a longitudinal axis 28 of the tracks 24, 26 and does not move in other directions.

On the outboard side 22, the mounting assembly 18 includes a first support member 30 and a second support member 32. The first 30 and second 32 support members are mounted to the upper track 26 and can move forwardly and rearwardly with the upper track 26. A load transfer member or beam 34 is supported on the upper track 26 by the first 30 and second 32 support members.

The inboard side 20 of the mounting assembly 18 includes a first support member 36 and a second support member 38. The support members 36, 38 for the inboard side 20 are preferably different than the support members 30, 32 of the outboard side 22 because the outboard support members 30, 32 are designed to receive the beam 34. While the mounting assembly 18 preferably supports the beam 34 on the upper track 26 of the outboard side 22, the beam 34 could also be supported on the inboard side 20. Also, a pair of beams 34 could be used, one on the outboard side 22 and one on the inboard side 20, instead of using a single beam 34. In this configuration the support members 36, 38 on the inboard side 20 would be similar to the support members 30, 32 of the outboard side 22.

Also the mounting assembly 18 with the beam 34 preferably includes a motorized seat adjuster arrangement, shown generally at 40, to position the seat assembly 10 in a position desired by a seat occupant. However, the mounting assembly 18 utilizing the first 30 and second 32 support members in conjunction with the upper 26 and lower 24 track assemblies could also be used with a mechanical seat adjuster arrangement.

Figure 3:
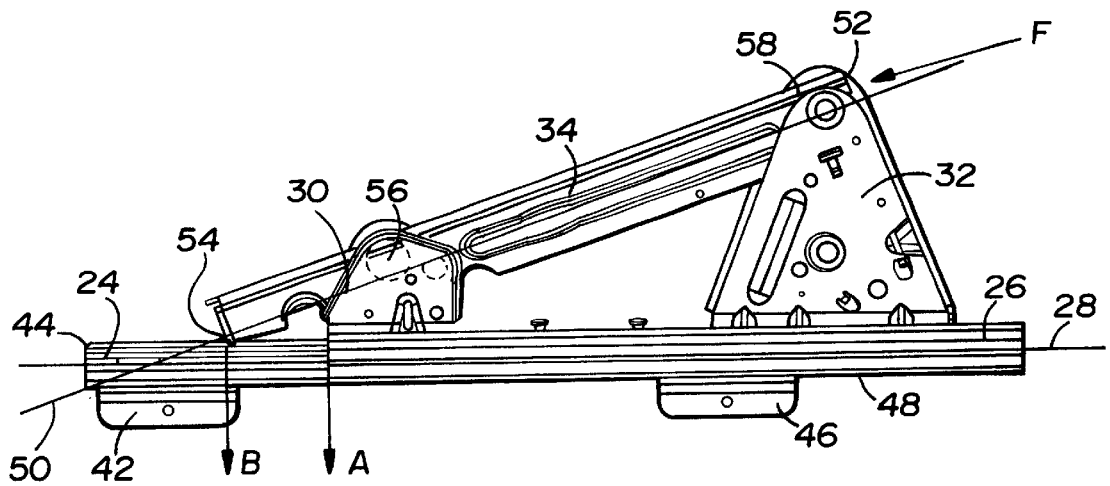
FIG. 3 is a side view of the preferred embodiment of the seat mounting assembly shown in a rearward position.
Figure 4:
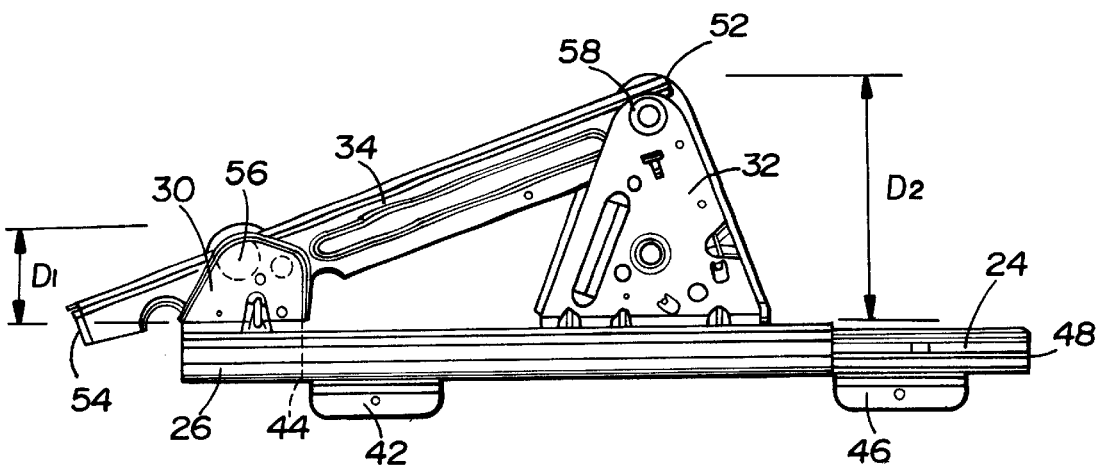
FIG. 4 is a side view of the preferred embodiment of the seat mounting assembly shown in a forward position.

FIGS. 3 and 4 show side views of the outboard side 22 of the mounting assembly 18. The following description will be directed toward the outboard side 22 of the mounting assembly 18 with the understanding that the inboard side 20 preferably does not have the beam 34 member. However, it should be understood, as discussed above that the beam 34 could be placed on the inboard side 20 or a pair of beam members 34 could be used in the mounting assembly 18. Using only one beam 34 is preferred because it provides the necessary structural strength for the seat assembly 10 without having the extra weight of two (2) beams 34.

FIG. 3 shows the outboard side 22 of the mounting assembly 18 with the upper track 26 in the rearward position, i.e., the seat 10 and the upper track 26 have been moved rearwardly with respect to the lower track 24. The mounting assembly 18 preferably includes a first mounting bracket 42 for mounting one end 44 of the lower track 24 to the vehicle floor 16 and a second mounting bracket 46 for mounting an opposite end 48 of the lower track 24 to the vehicle floor 16. The first 42 and second 46 mounting brackets are spaced apart from each other.

The beam 34 defines a second longitudinal axis 50 and is supported by the first 30 and second 32 support members. Preferably, the second longitudinal axis 50 is not parallel to the first longitudinal axis 28 such that a triangular relationship exists between the beam 34, the support members 30, 32 and the tracks 24, 26.

The mounting assembly 18 is preferably used on a seat 10 that has a seat belt assembly 11 solely supported by the seat 10, as shown in FIG. 1. This means that when a seat occupant is belted into the seat 10 the seat will be subject to a higher seat load than if the seat belt assembly 11 were supported by a vehicle structure. When the seat occupant experiences a deceleration the seat 10 experiences a seat load, shown by the "F" arrow in FIG. 3. The beam 34 receives this seat load and partially distributes the load to the first 30 and second 32 support members.

The upper track 26 moves between a forward position and a rearward position. In the rearward position, shown in FIG. 3, the first support member 30 is positioned between the first 42 and second 46 mounting brackets. Thus, the first support member 30 is positioned over a portion of the tracks 24, 26 that is not directly supported by either the first 42 or second 46 mounting brackets. The beam 34 has a first beam end 54 and a second beam end 52. The beam 34 is designed to shift the seat load applied at one end of the beam 52 from point A where the tracks 24, 26 are unsupported to point B where the lower track 34 is supported by the first mounting bracket 42. This shifting of the seat load is discussed in greater detail below.

The beam 34 has a first attachment portion 56 for attachment to the first support member 30 and a second attachment portion 58 for attachment to the second support member 32.

The second attachment portion 58 is located adjacent to the second end 52 of the beam 34 and the first attachment portion 56 is located at a point between the first 54 and second 52 ends such that the beam extends beyond the first attachment portion 56 with the first end 54 of the beam 34 engaging the lower track 24 when the lower track 24 is in the rearward position. As discussed above, the beam transfers the seat load applied at the second end 52 of the beam 34 from the second end 52 to the first end 54 such that the first end 54 engages the lower track 24 at a point above the first mounting bracket 42 when the lower track 24 is in the rearward position.

When the upper track 26 is in the forward position, shown in FIG. 4, the first support member 30 is positioned forwardly with respect to the first mounting bracket 42. In the forward position, the beam 34 extends beyond the first attachment portion 56 with the first end 54 of the beam 34 being unsupported with respect to the tracks 24, 26.

Figure 5:
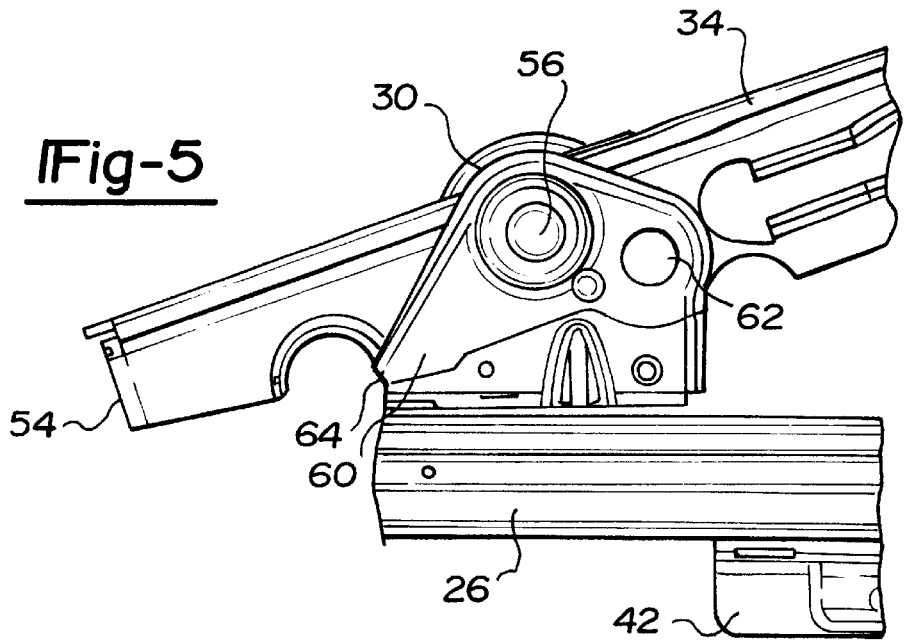
FIG. 5 is an enlarged side view partially cut away of the seat mounting assembly shown in FIG. 4.

The beam includes an engaging portion 60, shown in FIG. 5, located between the first 54 and second 52 ends. The beam 34 is designed such that the engaging portion 60 engages the upper track 26 when the upper track 26 is in the forward position. The beam 34 transfers the seat load applied at the second end 52 of the beam 34 from the second end 52 to the engaging portion 60. This positioning of the beam 34 prevents the seat load from buckling about point 62 and instead transfers the buckling load to point 64 where additional support is provided by the tracks 24, 26.

In addition to the all belts to seat load, the seat 10 experiences other types of seat loading. Preferably, the seat bottom 14 and seat back 12 are supported on the upper track 24 so that they can move axially with the upper track 26. In the preferred embodiment, the seat 10 is a split frame configuration where the seat back 12 is attached to the upper track 26 and moves independently from the seat bottom 14. The seat back 12 is also preferably pivotally mounted with respect to the upper track 26 so that the seat back 12 can be moved between an upright position where the seat back 12 is substantially vertical with respect to the seat bottom 14 and a recliner position where the seat back 12 is pivoted rearwardly such that an obtuse angle is formed between the seat back 12 and seat bottom 14 and/or the upper track 26. While a split frame style seat assembly 10 is preferred, it should be understood that the subject invention could also be used on other seat assembly styles that are well known in the art.

When the seat back 12 is in the recliner position, a tensile load is exerted on the first 30 and second 32 support members a rearward direction, i.e. the tensile load is exerted in a direction generally opposite of the seat load designated by the "F" arrow in FIG. 3. The beam 34 is designed so that the tensile load is distributed between the first 30 and second 32 support members, which reduces the overall loading on the tracks 24, 26.

Figure 6:
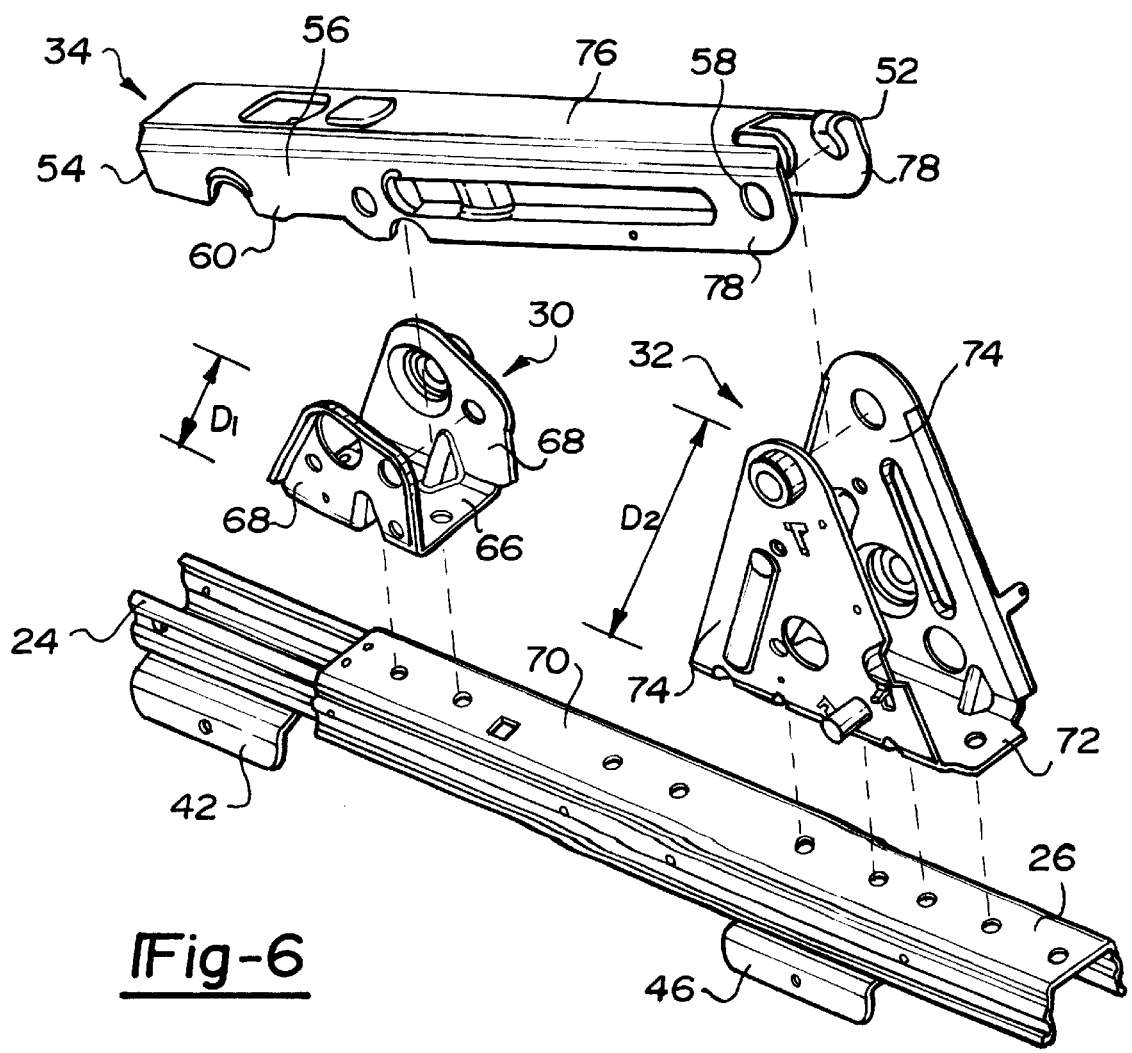
FIG. 6 is an exploded view of the seat mounting assembly shown in FIG. 3.

FIG. 6 shows an exploded view of the outboard side 22 of the mounting assembly 18. The first 30 and second 32 support members are preferably mounting brackets that are used to attach the load bearing member or beam 34 to the upper track 26. The first support member 30 includes a flat bottom portion 66 and a pair of upwardly extending plates 68. The flat bottom portion 66 is preferably attached to a top surface 70 of the upper track 26 by means well known in the art. The plates 68 extend outwardly from the upper track 26 in a direction toward the seat bottom 14 at a first distance D1, also shown in FIG. 4.

The second support member 32 includes a flat bottom portion 72 and a pair of upwardly extending plates 74. The flat bottom portion 72 is also preferably attached to the top surface 70 of the upper track 26. The plates 74 for the second support member 32 extend outwardly from the upper track 26 at a second distance D2 that is preferably greater than the first distance D1.

The beam 34 is preferably received at the first end 54 between the plates 68 for the first support member 30 and at the second end 52 between the plates 74 for the second support member 32 such that a generally triangular load bearing arrangement is achieved between the beam 34, the second support member 32 and the lower 24 and upper 26 tracks. This triangular load bearing arrangement allows seat loads to be substantially distributed between the first 30 and second 32 support members, thus reducing the overall load on the tracks 24, 26.

The beam 34 is preferably comprised of a base portion 76 with a pair of side walls 78 extending downwardly from the base portion 76 toward the upper track 26. While the preferred embodiment has the side walls 78 extending downwardly toward the tracks 24, 26, it should be understood that the beam 34 could also be positioned with the side walls 78 extending outwardly from the base portion 76 in other directions. The side walls 78 are preferably attached to the plates 68, 74 of the first 30 and second 32 support members, respectively.

The subject invention offers several advantages over prior art "all belts to seat" mounting assemblies because it provides a durable and robust mounting assembly that reduces the overall number of parts, reduces weight and overall assembly cost. The load transfer member or beam 34 designed to receive and distribute seat loads between the first 30 and second 32 support members, thus reducing the overall seat load that is transferred to the tracks 24, 26. The beam 34 also more evenly distributes the seat load that is transferred to the tracks 24, 26 so that likelihood of track separation from the vehicle due to overloading a single portion of the track is reduced. The mounting assembly 18 is also designed to provide adequate structural strength when the seat is in the forward or rearward position and when the seat back is in the upright or recliner position.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An assembly for mounting a seat within a vehicle comprising, in combination:
    a first track defining a first longitudinal axis;
    a second track supported for movement relative to said first track;
    a first support member supported on said second track;
    a second support member supported on said second track and spaced apart from said first support member; and
    a beam defining a second longitudinal axis and supported on said second track by said first and second support members, said beam for partially distributing a seat load between sad first and second support members;
    wherein said beam comprises a base portion with a pair of side walls extending downwardly from said base portion toward said second track, said side walls being attached to said first and second support members.

2. An assembly as recited in claim 1 wherein said beam is orientated such that said first longitudinal axis is non-parallel to said second longitudinal axis.

3. An assembly as recited in claim 1 including a first mounting bracket for mounting one end of said first track to a vehicle structure and a second mounting bracket for mounting an opposite end of said first track to said vehicle structure.

4. An assembly as recited in claim 3 wherein said second track moves between a forward position where said first support member is positioned forwardly with respect to said first mounting bracket and a rearward position where said first support member is positioned between said first and second mounting brackets.

5. An assembly as recited in claim 4 wherein said beam has a first attachment portion for attachment to said first support member and a second attachment portion for attachment to said second support member.

6. An assembly as recited in claim 5 wherein said beam has a first end and a second end, said second attachment portion being located adjacent to said second end and said first attachment portion being located at a point between said first and second ends such that said beam extends beyond said first attachment portion with said first end of said beam engaging said first track when said second track is in said rearward position.

7. An assembly as recited in claim 6 wherein said beam partially transfers the seat load applied at said second end of said beam from said second end to said first end of said beam such that said first end of said beam engages said first track at a point above said first mounting bracket when said second track is in said rearward position.

8. An assembly as recited in claim 5 wherein said beam has a first end and a second end, said second attachment portion being located adjacent to said second end and said first attachment portion being located at a point between said first and second ends such that said first end of said beam extends beyond said first attachment portion in a cantilevered manner when said second track is in said forward position.

9. An assembly as recited in claim 8 wherein said beam includes an engaging portion located between said first and second ends, said engaging portion for engaging said second track when said second track is in said forward position.

10. An assembly as recited in claim 9 wherein said beam partially transfers the seat load applied at said second end of said beam from said second end to said engaging portion.

11. An assembly for mounting a seat within a vehicle comprising, in combination:
    a first track defining a first longitudinal axis;
    a second track supported for movement relative to said first track;
    a first support member supported on said second track;
    a second support member supported on said second track and spaced apart from said first support member; and
    a beam supported on said second track by said first and second support member and defining a second longitudinal axis, which is non-parallel to said first longitudinal axis, said beam fixed to said first and second supports for movement therewith without relative movement, and for receiving a seat load and transferring the seat load to said first and second support members;
    wherein said first support member is comprised of a generally flat bottom portion and a pair of upwardly extending plates, said flat bottom portion being attached to a top surface of said second track and said plates extending outwardly from said second track at a first distance.

12. An assembly as recited in claim 11 wherein said second support member is comprised of a generally flat bottom portion and a pair of upwardly extending plates, said flat bottom portion being attached to said top surface of said second track and said plates for said second support member extending outwardly from said second track at a second distance greater than said first distance.

13. An assembly as recited in claim 12 wherein said beam is received at one end between said plates for said first support member and at said opposite end between said plates for said second support member such that a generally triangular load bearing arrangement is achieved between said beam, said second support member and said first and second tracks.

14. An assembly as recited in claim 13 wherein said beam is comprised of a base portion with a pair of side walls extending downwardly from said base portion toward said second track, said side walls being attached to said plates of said first and second support members.

15. A vehicle seat assembly comprising, in combination:
   a seat bottom;
   a seat back;
   a first track;
   a second track supported for movement relative to said first track, said seat bottom being supported on said second track for movement with said second track;
   a first support member supported on said second track;
   a second support member supported on said second track and spaced apart from said first support member; and
   a beam defining a second longitudinal axis and supported on said second track by said first and second support members, said beam for partially distributing a seat load between said first and second support members;
   wherein said first and second support members each include a generally flat bottom portion and a pair of outwardly extending plates spaced apart from one another wherein said flat bottom portions are fastened to a top surface of said second track and plates extend upwardly from said second track toward said seat bottom, said plates for said first support member extending outwardly from said second track at a first distance and said plates for said second support member extending outwardly from said second track at a second distance, said second distance being greater than said first distance.

16. A vehicle seat assembly as recited in claim 15 wherein said seat back is moveable between an upright position where said seat back is substantially vertical with respect to said seat bottom and a recliner position where said seat back is reclined rearwardly such that an obtuse angle is formed between said seat bottom and said seat back, said seat back exerting a tensile load on said beam when said seat back is in said recliner position wherein said beam distributes the tensile load between the first and second support members.

17. A vehicle seat assembly as recited in claim 15 wherein said beam includes a base portion and a pair of side walls, said beam being received by said first and second support members between said pairs of plates such that said side walls are attached to said plates.

18. A vehicle seat assembly as recited in claim 15 wherein said beam has a first end and a second end, said first support member being attached to said beam at a beam portion between said first and second ends and said second support member being attached to said beam adjacent to said second end such that a generally triangular load bearing arrangement is achieved between said beam, said second support member, and said second track.

19. A vehicle seat assembly as recited in claim 15 wherein said beam is orientated such that said first longitudinal axis is non-parallel to said second longitudinal axis.

20. A vehicle seat assembly as recited in claim 15 including a first mounting bracket for mounting one end of said first track to a vehicle structure and a second mounting bracket for mounting an opposite end of said first track to said vehicle structure wherein said second track moves between a forward position where said first support member is positioned forwardly with respect to said first mounting bracket and a rearward position where said first support member is positioned between said first and second mounting brackets.

21. A vehicle seat assembly as recited in claim 20 wherein said beam has a first beam end and a second beam end, said first support member being attached to said beam at a point between said first and second beam ends and said second support member being attached to said beam adjacent to said second end.

22. A vehicle seat assembly as recited in claim 21 wherein said second seat track is moveable between a forward position where said first beam end is cantilevered with respect to said second track and a rearward position where said first beam end engages said first track.

23. A vehicle seat assembly as recited in claim 22 wherein said beam transfers the seat load applied at said second end of said beam from said second end to said first end of said beam such that said first end of said beam engages said first track at a track portion supported by said first mounting bracket when said second track is in said rearward position.

24. A vehicle seat assembly as recited in claim 22 wherein said beam includes an engaging portion for engaging said second track, said beam partially transferring the seat load applied at said second end of said beam from said second end to said engaging portion when said second track is in said forward position.

25. An assembly as recited in claim 1 wherein said beam is fixed to said first and second supports for movement therewith without relative movement thereto.

26. An assembly for mounting a seat within a vehicle comprising, in combination:
   a first track defining a longitudinal axis;
   a second track supported for movement relative to said first track;
   a first support member supported on said second track;
   a second support member supported on said second track and longitudinally spaced apart from said first support member along said first longitudinal axis; and
   a beam having a first end, a second end and an engaging portion for engaging the second track, said beam attached to the first support member at a point and attached to the second support member near a second end, with the engaging portion positioned between the first end of the beam and the point, said beam defining a second longitudinal axis and supported on said second track by said first and second support members, said beam for partially distributing a seat load between said first and second support members, wherein the seat load is partially transferred from the second end of the beam to the engaging portion.

27. An assembly for mounting a seat within a vehicle comprising, in combination:
   a first track defining a longitudinal axis;
   a second track supported for movement relative to said first track;
   a first support member supported on said second track;

a second support member supported on said second track and longitudinally spaced apart from said first support member along said first longitudinal axis, said support members adapted to be mounted to the second track remote from a seat bottom; and a beam defining a second longitudinal axis and supported on said second track by said first and second support members, said beam for partially distributing a seat load between said first and second support members.

28. The assembly of claim 27 for mounting a seat within a vehicle further comprising:

a third track extending parallel with and spaced longitudinally from the first track; and a fourth track supported for movement relative to said third track, extending parallel to the second track and movable with the second track.

* * * * *